United States Patent
Schuller et al.

(10) Patent No.: US 10,117,057 B2
(45) Date of Patent: Oct. 30, 2018

(54) METHOD AND SYSTEM FOR LOCATING A MOBILE DEVICE

(71) Applicant: Audi AG, Ingolstadt (DE)

(72) Inventors: Florian Schuller, Ismaning (DE); Harald Altinger, Gerolfing (DE)

(73) Assignee: AUDI AG, Ingolstadt (DE)

( * ) Notice: Subject to any disclaimer, the term of this patent is extended or adjusted under 35 U.S.C. 154(b) by 338 days.

(21) Appl. No.: 15/101,554

(22) PCT Filed: Feb. 25, 2015

(86) PCT No.: PCT/EP2015/000435
§ 371 (c)(1),
(2) Date: Jun. 3, 2016

(87) PCT Pub. No.: WO2015/128085
PCT Pub. Date: Sep. 3, 2015

(65) Prior Publication Data
US 2018/0176735 A1    Jun. 21, 2018

(30) Foreign Application Priority Data

Feb. 26, 2014    (DE) .................. 10 2014 002 821

(51) Int. Cl.
*H04W 24/00*    (2009.01)
*G01C 21/00*    (2006.01)
(Continued)

(52) U.S. Cl.
CPC ............ *H04W 4/024* (2018.02); *G01C 21/20* (2013.01); *G05D 1/0274* (2013.01);
(Continued)

(58) Field of Classification Search
CPC ... H04W 4/024; H04W 64/006; H04W 4/025; H04W 4/029; G01C 21/20; G05D 1/0274
(Continued)

(56) References Cited

U.S. PATENT DOCUMENTS 8,649,565 B1    2/2014    Kim et al.
2005/0182518 A1    8/2005    Karlsson
(Continued)

FOREIGN PATENT DOCUMENTS

CN    1940590 A    4/2007
CN    101452070 A    6/2009
(Continued)

OTHER PUBLICATIONS

English-language abstract of Chinese Patent Application Publication No. CN 1940590 A, published Apr. 4, 2007; 1 page.
(Continued)

*Primary Examiner* — Allahyar Kasraian
*Assistant Examiner* — Mark G Pannell
(74) *Attorney, Agent, or Firm* — Sterne, Kessler, Goldstein & Fox P.L.L.C.

(57) ABSTRACT

The invention relates to a method for locating a mobile device in a surrounding area, wherein the device has multiple sensors for detecting the area surrounding the device using different locating methods, wherein a reference map is provided for the surrounding area, said reference map comprising multiple positions within the surrounding area, wherein at least one locating method which is to be carried out using at least one sensor in order to detect the surrounding area is recommended for at least one position within the surrounding area, wherein the at least one locating method recommended according to the reference map and to be carried out using at least one sensor is used for a current position of the mobile device in order to locate the device.

18 Claims, 1 Drawing Sheet

(51) Int. Cl.
| | |
|---|---|
| *G01C 21/10* | (2006.01) |
| *G08G 1/123* | (2006.01) |
| *H04W 4/024* | (2018.01) |
| *G01C 21/20* | (2006.01) |
| *G05D 1/02* | (2006.01) |
| *H04W 4/029* | (2018.01) |
| *H04W 4/02* | (2018.01) |
| *H04W 64/00* | (2009.01) |

(52) U.S. Cl.
CPC ........... *H04W 4/025* (2013.01); *H04W 4/029* (2018.02); *H04W 64/006* (2013.01)

(58) Field of Classification Search
USPC ....................................................... 455/456.1
See application file for complete search history.

(56) References Cited

U.S. PATENT DOCUMENTS

| | | |
|---|---|---|
| 2010/0110412 A1 | 5/2010 | Basu et al. |
| 2010/0182199 A1 | 7/2010 | Jeong |
| 2011/0054791 A1 | 3/2011 | Surampudi et al. |
| 2012/0105821 A1 | 5/2012 | Moser et al. |
| 2012/0121161 A1 | 5/2012 | Eade et al. |
| 2012/0232795 A1 | 9/2012 | Robertson et al. |
| 2012/0306847 A1 | 12/2012 | Lim et al. |
| 2014/0005933 A1 | 1/2014 | Fong et al. |

FOREIGN PATENT DOCUMENTS

| | | |
|---|---|---|
| EP | 1 923 763 A1 | 5/2008 |
| EP | 1 901 152 B1 | 12/2011 |
| WO | WO 2011/033100 A1 | 3/2011 |

OTHER PUBLICATIONS

English-language abstract of Chinese Patent Application Publication No. CN 101452070 (A), published Jun. 10, 2009; 1 page.
International Search Report and Written Opinion of the International Searching Authority directed to related International Patent Application No. PCT/EP2015/000435, dated May 29, 2015, with attached English-language translation; 13 pages.
International Preliminay Report on Patentability directed to related International Patent Application No. PCT/EP2015/000435, completed Feb. 3, 2016, with attached English-language translation; 13 pages.
Thorpe, et al., "Annotated Maps for Autonomous Land Vehicles," Proceedings of the IEEE International Conference on Man and Cybernetics Systems, Nov. 4-7, 1990; pp. 282-288.
"Simultaneous localization and mapping," Wikipedia, last modified Mar. 22, 2016 (accessible at http://en.wikipedia.org/Simultaneous_localization_and_mapping); 7 pages.
"Monte Carlo localization," Wikipedia, last modified Apr. 19, 2016 (accessible at http://en.wikipedia.org/Monte_Carlo_localization); 4 pages.

METHOD AND SYSTEM FOR LOCATING A MOBILE DEVICE

TECHNICAL FIELD

The invention relates to a method and to a system for locating a mobile device.

BACKGROUND

For the determination of a position of a motor vehicle, it is possible to use a procedure such as, for example, SLAM (Simultaneous Localization And Mapping: http://de.wikipedia.org/wiki/Simultaneous_Localization_and_Mapping) or MCL (Monte Carlo Localization, http://en.wikipedia.org/wiki/Monte_Carlo_localization). Here, the same procedure is used in every situation. In order to generate a hypothesis for the position to be determined, multiple sensors can be used, wherein data of these sensors are merged. The two mentioned procedures are described in the book "Probabilistic Robotics (Intelligent Robotics and Autonomous Agents)" by Thrun, Burgard and Fox (ISBN: 9780262201629).

A method for estimating a pose of a mobile robot using a particle filter is known from the published document EP 1 923 763 A1. Here, possible errors of a sensor of the robot are corrected taking into consideration a particle stream.

A movement system known from the published document EP 1 901 152 B1 is designed for locating and mapping a particle filter unit. Here, using the particle filter unit, poses of current particles are determined. In addition, using a sensor, a pose variant of a pose of a mobile element is detected.

The published document WO 2011/033100 A1 describes a method for creating a map pertaining to location-based indications on the probability of a future movement of a person in a spatial environment.

BRIEF DESCRIPTION OF THE DRAWINGS/FIGURES

DETAILED DESCRIPTION

Figure 1:
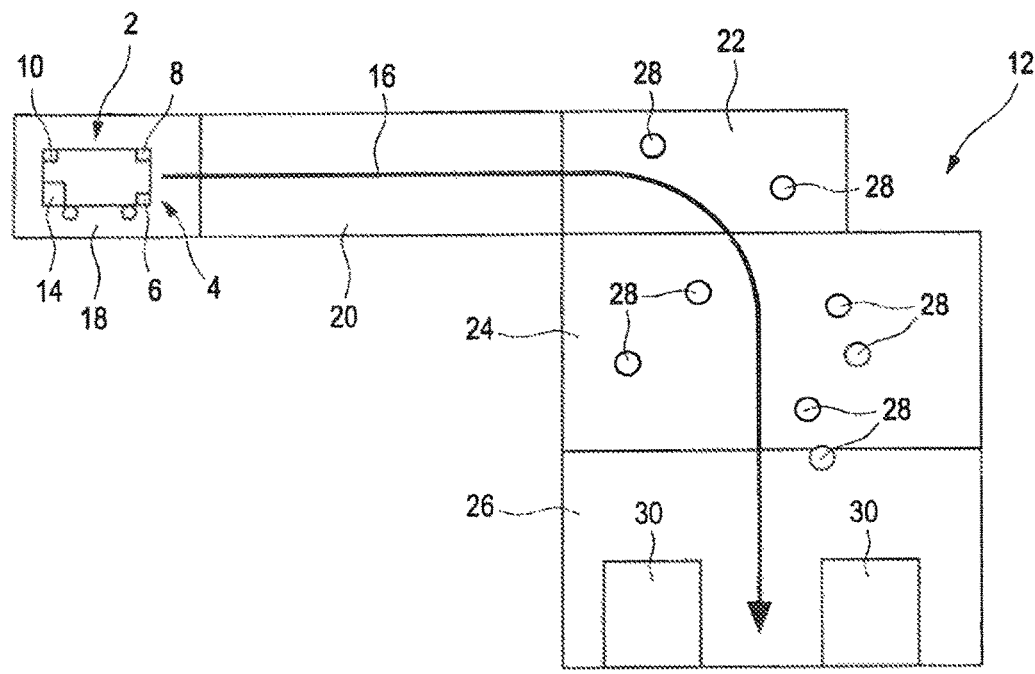
FIG. 1 shows, in a diagrammatic representation, a mobile device which comprises an embodiment of a system according to the invention, when carrying out an embodiment of the method according to the invention.

On this background, a method as well as a system having the features of the independent claims is presented. Designs of the provided method and system result from the dependent claims and the description.

The method according to the invention is provided for locating a mobile device in a surrounding area. The device has multiple sensors for detecting the area surrounding the device using different locating methods, wherein a reference map for the surrounding area is provided and used, said reference map comprising multiple positions within the surrounding area. Here, at least one locating method, which is to be carried out using, at least one sensor in order to detect the surrounding area, is recommend for at least one position, as a rule for every position that the device can assume within the surrounding area and/or according to the reference map, wherein the at least one locating method, recommended according to the reference map, which is to be carried out using at least one sensor, is used for a current position of the mobile device in order to locate the device.

As a rule, for every position that is recorded in the reference map, precisely one locating method which can be carried out using a sensor is recommended. However, it is also possible that more than one locating method, each of which can be carried out with at least one sensor, is recommended for one position. For example, this can be due to each sensor having a different detection direction. In this way, for one position, different locating methods can be carried out depending on the direction.

Each sensor is influenced differently by landmarks in the surrounding area. Thus, it may be known that a sensor delivers incorrect measurements for some positions. These can be avoided if this sensor is deactivated in certain regions. It is also possible during, the merging to downgrade data from a sensor that delivers incorrect measurements for certain positions during the merging, during processing, usually, wherein data from multiple sensors are taken into consideration.

In addition, for a future movement of the device, for example, for a trip of the device, a path to be traveled within the surrounding area is planned, and in each case the at least one locating method recommended according to the reference map is used for positions of the device along the path, i.e., a locating method or multiple locating methods which is or are to be carried out with at least one sensor is/are used. In this way, the surrounding area can be detected in a predictive manner by early selection of the at least one locating method.

Here, the at least one locating method is determined taking into consideration a perspective of the at least one sensor, perspective which the sensor assumes for a position of the mobile device within the surrounding area, is determined taking into consideration the range and any possible incorrect measurements.

The perspective of the at least one sensor is determined as a function of a position of the sensor and as a function of a detection direction of the sensor starting from the position thereof. Here, the current position, a current perspective, and a current detection direction of the sensor are operating parameters of this sensor.

As an additional operating parameter of the sensor, the range or detection range thereof is taken into consideration. If it is known that the sensor performs an incorrect measurement at a position in the surrounding area depending on the situation, the range of the sensor can be adapted, as a rule shortened.

Additional operating parameters for sensors that are designed as cameras are the brightness, an aperture setting, etc. These parameters can now be set in advance for each position, if information pertaining thereto has been stored in the reference map.

The surrounding area can be subdivided into different regions or sections and/or sectors in the reference map. For positions that are located within a usually interconnected region, the same at least one locating method can be carried out using the same at least one sensor. Here, the path can also be subdivided into different sections, wherein each section passes through one of the regions.

A current position of the device is determined in a configuration via a positioning system (GPS) if the device can receive data from the positioning system.

A locating of the device can also be carried out within a building or within a parking garage. Depending on the reception, information of the positioning system can also be taken into consideration here. Thus, an initial estimation of the position is possible within the building. Outside of the building, information of the positioning system can be received unimpeded by the device.

In a configuration, the at least one locating method for a position is determined taking into consideration a distribution of landmarks, or a distribution of landmarks that can be seen by the sensor, in the surrounding area. Here, the at least one locating method for a position can be determined taking into consideration a density of landmarks in the surrounding area and/or taking into consideration a distance of the position from the landmarks in the surrounding area. Various stationary objects, for example, trees, buildings or traffic signs, can be used here as landmarks. Possibly, landmarks can also be designed in the form of bar codes, for example, two-dimensional bar codes, or columns within a building.

The at least one locating method for a position can be set via a range as operating parameter of the at least one sensor. Additional operating parameters to be taken into consideration and/or to be set can be a sensitivity, an aperture angle or a measurement frequency of the sensor.

The reference map is determined in a configuration using reference measurements. For this purpose, the device is arranged in the surrounding area. For carrying out a reference measurement at a position, all the locating methods are carried out with all the sensors and tested in the process. From this at least one locating method suitable for the position, which is to be carried out with at least one sensor, is determined and noted for this position in the reference map. Since the surrounding area can change, reference measurements in which the reference map is updated can be carried out as many times as desired.

The method can be carried out for a mobile device that is designed as a motor vehicle.

The system for locating a mobile device in a surrounding area has multiple sensors for the detection of the area surrounding the device using different locating methods. Here a reference map is provided for the surrounding area, said reference map comprising multiple positions within the surrounding area, wherein at least one locating method, which is to be carried out using at least one of the multiple sensors in order to detect the surrounding area, is to be recommended for at least one position that is recorded in the reference map, as a rule for every position that is usually accessible to the mobile device. The at least one locating method noted in the reference map and recommended according to the reference map, which is to be carried out with at least one of the multiple sensors, is to be used for a current position of the mobile device in order to locate the device.

In addition, the system comprises a control apparatus which is designed to detect the current position of the mobile device by exchange of information with an external positioning system, and to control the at least one sensor for carrying out the at least one locating method. Data for the current position of an antenna of the system are here provided by the positioning system via electromagnetic waves.

When the method is carried out, in a configuration, a position-dependent approach is used for locating a motor vehicle as a mobile device, which is based on data of the reference map of the surrounding area in which the motor vehicle is located and on a path to be traveled that has been planned for the motor vehicle. By completing the data of the reference map and the path with reference measurements, it is predetermined which sensor-supported locating method or positioning method is to be used in which region of the territory and/or along which section of the path.

As a function of position, a detection method to be carried out by a sensor for detecting the surrounding area is selected in a targeted manner and parameterized. The results of this include that the position errors resulting from known, possibly flawed measurements of a sensor used can be prevented. By reducing incorrect or ambiguous measurements, a more robust hypothesis for a position of the motor vehicle to be calculated can be provided. If a locating method or a detection method can be dispensed with, a sensor to be used for that purpose can be deactivated, as a result of which energy required for operating this sensor can be saved. Moreover, computing power of a control apparatus, by means of which the locating method is otherwise carried out, can be reduced, which can also save energy.

In order to carry out the method, as landmarks, infrastructure devices can be used unchanged and thus without structural adaptation. All the data that are used for determining the position and/or for determining a hypothesis for the position can be determined by at least one reference measurement in a surrounding area provided for the motor vehicle using a sensor designed as reference sensor. Thus, in the context of the method, a sensor suitable for the respective surrounding area in which the motor vehicle is located is used for detecting objects in the surrounding area depending on the range thereof, as a result of which a locating of the motor vehicle as well as a hypothesis concerning the position thereof is carried out.

In the method for locating the mobile device, which can comprise the at least one sensor for detecting an area surrounding the device using different locating methods, a path to be traveled for a trip of the device is planned. Here, the planned path is subdivided into regions or sections, wherein each section is a function of the respective surrounding area. Here, for each section, a locating method adapted to the surrounding area is used, said locating method being recommended for each position within the section. Thus, in each case, a locating method is used as a function of the surrounding area and/or the situation, wherein the locating methods can be methods such as Hector SLAM or UKF (Unscented Kalman Filter), for example. Such locating methods are derived from SLAM, which comprises a group of locating methods, or MCL, a mathematical locating method.

Thus, a locating method adapted to the respective surrounding area, which can be carried out by a sensor, can be selected. Since in each case a locating method is selected from several available locating methods which can each be carried out by at least one sensor provided for this purpose, the other locating methods can be dispensed with in a current section of the area surrounding the device. Thus, a sensor which would deliver incorrect measurements in a surrounding area can be deactivated. In addition, measurement threshold values, for example, for a sensitivity, a measurement frequency for a number of measurements to be carried out using sensors, a maximum distance or a detection range and/or a fire strategy, by means of which a direction for detecting the surrounding area and thus the respective detection direction of the sensor are determined, can be adapted as operating parameters of a sensor.

As operating parameters, it is also possible to adapt or parameterize a sensor preprocessing, for example, a noise swell in the case of an ultrasound sensor or a white balance in the case of a camera as sensor.

Which locating method is to be carried out with which sensor is indicated in the reference map. Here, operating parameters of the sensor to be used can also be established automatically by selecting the locating method. However, it is also possible to adapt values for operating parameters of the sensor to the surrounding area. In addition, a locating method can also be selected by way of the direction and/or perspective from which the surrounding area is to be detected by a sensor. Accordingly, it is possible that, for a position along the path in a first direction, a first locating method is to be carried out with a first sensor, and, in another direction, a second locating method is to be carried out with a second sensor. The reference map is provided by the at least one reference measurement during a reference trip, wherein an association of a concrete surrounding area with a concrete locating method is determined, wherein a current perspective and detection device of a sensor within the surrounding area can also be taken into consideration.

The system can have at least one sensor designed as an ultrasound sensor. Laser sensors as well as cameras can also be used. However, such an ultrasound sensor is susceptible to ground reflections, i.e., the sound emitted by the ultrasound sensor is reflected on the ground of the surrounding area, as a result of which, again, for an object to be detected in the surrounding area, an incorrect distance from this object is delivered. Taking this into consideration, it is possible, for a certain position within the surrounding area, to set as well as adapt a range of the ultrasound sensor by selecting a locating method, among other factors. Alternatively or additionally, a probability for a measurement error of the ultrasound sensor can be reduced by selecting a locating method. In a configuration, the ultrasound sensor can be switched off in a certain surrounding area and/or at a certain position. Instead, another sensor of the system with utilization of an alternative locating method is used.

A first estimation of a position of the device along the path to be traveled is as a rule carried out by a navigation system which is assisted by a positioning system such as UPS, for example, wherein the mobile device is located using the positioning system. For the mobile device, a locating to be determined via the positioning system can have a precision of as little as a few meters. In the context of the method, a precision for the locating can be improved.

The method can be carried out, for example, for a device designed as a motor vehicle. Here, it is taken into consideration that a sensor designed as a laser scanner, for example, which is arranged on the motor vehicle, assumes a first flat perspective for the case in which the motor vehicle is located on a straight flat plane. In contrast, in the case in which the motor vehicle travels on an inclined slope or ramp, the sensor assumes a second inclined perspective. Accordingly, a locating method to be used is to be selected, among other things, as a function of an angle of a detection direction that the motor vehicle assumes relative to a reference plane to be defined. In order to switch between two locating methods, it is necessary to take into consideration the position within the surrounding area at which the angle that the motor vehicle assumes relative to the reference plane changes. Such a position can also be referred to as kink. The perspective of the sensor also depends on the angle that the motor vehicle assumes. The position for the change of the angle, wherein reference can be made to a change of the locating method, is deposited or stored in the reference map.

When the method is carried out, a locating method can be deactivated if otherwise data flawed due to position or no data at all are provided by the locating method at a current position and/or in a section of the surrounding area. A computing load of the control apparatus of the system can be reduced by switching off a sensor and/or by deactivating a locating method. This relates, for example, to camera-based locating methods using cameras as sensors for which a high computing load is to be used. However, if it is known that in a certain section of the surrounding area no features, usually objects, are present, by means of which a position of the device can be determined using the camera-based locating method, this locating method can be switched off, and a computing capacity of the control apparatus that has been freed thereby can be used for other processes, as a result of which an electrical power consumption of the control apparatus can be cut back and thus energy can be saved. Usually, a sensor can be switched into a rest mode or a sleep mode as a function of positioning, so that the sensor needs only a small amount of energy. A sensor can also be completely deactivated in certain positions of the surrounding area.

Alternatively or additionally, a surrounding area can be defined by a presence of features. i.e., of landmarks and thus of objects, in the surrounding area. If these features and/or objects within the surrounding area can be ranked and/or classified by means of the possibly standardized appearance thereof, a so-called marker-based locating method can be used. Features and/or objects having a standardized appearance include roadway markings, signs and/or two-dimensional bar codes. If it is possible to establish that, in a section of the surrounding area, no landmarks or only insufficient landmarks are present, a locating method based thereon cannot be used.

A possible locating method can accordingly also be selected depending on the maximum distance of landmarks or objects in a section of the surrounding area from a sensor by means of which the locating method is carried out, so that the landmarks can be detected by this sensor. Thus, for a section of the surrounding area in which the landmarks are far removed from the sensor, a locating method with a sensor for a large range can be used, and in a section of the surrounding area in which the landmarks are located close to the sensor, a locating method with a small range of the sensor can be used. Thus if it is known for a surrounding area that landmarks are too far away to enable measurements with a certain sensor using certain locating methods, the sensor to be used for this purpose can be deactivated. Thus, a range of an ultrasound sensor is only a few meters, for example, 4 m. However, if landmarks to be detected are too far away, the ultrasound detectors no longer deliver measurement data and can be deactivated.

The reference map, which can be determined for a certain section of the surrounding area in a reference measurement, can be designed as a so-called two-dimensional grid map (occupancy grid), as a vector map, a multilayer or a tree map. Information pertaining to this can be obtained from the book "Probalistic Robotics" cited above. In such reference maps, regions, i.e., sectors and/or sections, are defined in the surrounding area, wherein information that provides information regarding a position-dependent locating method to be used is deposited in the reference map configured as meta information. Thus, this meta-information is sensor dependent and includes entries about which locating method can be used, how large a minimum range of a sensor to be used should be and/or how large a maximum distance of the sensor from the possibly present walls as landmarks should be. The meta-information can also include entries of illumination conditions and/or a type of landmarks that are present. Based on the current position of the mobile device, as a rule a motor vehicle or an autonomous robot, it is established in which sector of the surrounding area and/or reference map said device is located. The meta-data from the reference map are read out as a function of position and/or sector, and the sensors and/or locating, methods to be used are parameterized.

Additional advantages and designs of the invention result from the description and the appended drawing.

The above-mentioned features, which are to be explained in further detail below, can be used not only in the respective combination indicated, but also in other combinations or alone, without leaving the scope of the present invention.

The invention is represented diagrammatically using an embodiment in the drawings and is described diagrammatically and in detail in reference to the drawings.

FIG. 1 shows, in a diagrammatic representation, a mobile device which comprises an embodiment of a system according to the invention, when carrying out an, embodiment of the method according to the invention.

Figure 2:
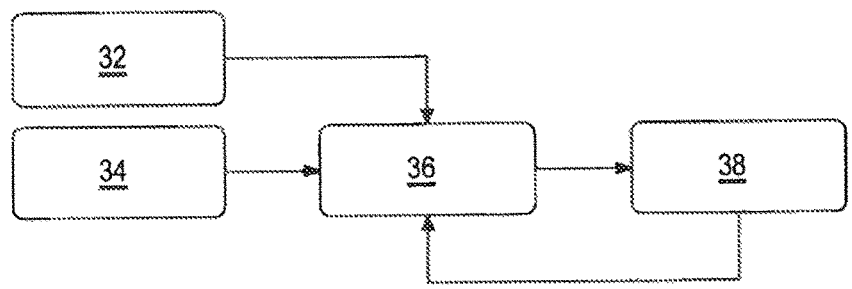
FIG. 2 shows a diagram for carrying out the embodiment of the method according to the invention.

FIG. 2 shows a diagram for carrying out the embodiment of the method according to the invention.

FIG. 1 shows, in a diagrammatic representation, a mobile device 2 designed as a motor vehicle, which comprises the embodiment of the system 4 according to the invention. Here, the system 4 has multiple sensors 6, 8, 10, of which, however, only three are represented in FIG. 1. Each of these sensors 6, 8, 10 is designed for detecting a surrounding area 12 and thus an environment of the mobile device 2, wherein at least one locating method for detecting the surrounding area 12 is used by each sensor 6, 8, 10. In addition, the system 4 comprises a control apparatus 14 for controlling at least one step of an embodiment of the method according to the invention.

When the embodiment of the method is carried out, it is provided here that the device 2 moves within the surrounding area 12 along a path that is indicated by a curve 16 in FIG. 1. This path extends through five regions 18, 20, 22, 24, 26 or sections or sectors of the surrounding area 12.

A reference map is deposited in the control apparatus 14 of the system 4. This reference map is determined by reference measurements for positions which the mobile device 2 can assume within the surrounding area 12. Here, a reference measurement is carried out for a respective position, wherein, in the respective position, each locating method that can be carried with the sensor 6, 8, 10 is carried out with each of the sensors 6, 8, 10. Here, for each of these positions, at least one locating method that is to be carried out with at least one sensor 6, 8, 10 and by means of which the surrounding area 12 is to be detected satisfactorily is determined and noted in the reference map. Here it is possible to complete and/or update the reference map by reference measurements to be carried out anew.

Which at least one locating method is to be recommended, and with which at least one sensor 6, 8, 10 and for which position in the surrounding area 12 according to the reference map, depends here on a distribution of landmarks 28, 30 within the surrounding area 12. These landmarks 28, 30 are objects arranged in fixed position of varying size which are distributed with different densities in the surrounding area 12. Some landmarks 30 are ranked here as obstacles. The surrounding area 12 is subdivided here via the reference map into the five regions 18, 20, 22, 24, 26, wherein, according to the reference map, for each region 18, 20, 22, 24, 26, each of which includes a plurality of positions, in each case at least one locating method to be carried out in each case with at least one sensor 6, 8, 10 is recommended.

For the further description of the embodiment of the method, reference is also made to the diagram of FIG. 2. During the trip planned for the mobile device 2 along the path, a determination 32 of a current and/or initial position is carried out for the mobile device 2 via a positioning system, for example, GPS, wherein the position is usually estimated.

For a respective surrounding area, the reference map can be loaded from a database into the control apparatus 14 of the system 4 and used to carry out the method, independently of whether the surrounding area is arranged inside or outside of a building. In addition, an analysis 34 as a function of position is carried out for the reference map. As a function of the current position, a position-based selection 36 is made for this current position taking into consideration the reference map, as to which locating method is to be carried out with which sensor 6, 8, 10, wherein here, for each region 18, 20, 22, 24, 26, a certain locating method to be carried out with a certain sensor 6, 8, 10 is recommended.

Here, in a configuration, a verification is carried out as to the region 18, 20, 22, 24, 26 in which the current position of the mobile device 2 within the surrounding area 12 is located, wherein the designated locating method is selected with the designated sensor 6, 8, 10 as a function of the regions. In a final step, the locating 38 of the mobile device 2 is carried out using the designated locating method with the designated sensor 6, 8, 10. Here, the results of this locating 38 can also be used for an additional reference measurement and thus for updating the reference map. Thus, a new selection 36 can also be updated, and, in the case of a new locating 38, an additional designated locating method can be carried out in a position-dependent manner using an additional designated sensor 6, 8, 10.

The invention claimed is:

1. A method for locating a mobile device in a surrounding area, wherein the mobile device has multiple sensors for detecting the surrounding area using different locating methods, wherein a reference map is provided for the surrounding area, the reference map comprising multiple positions within the surrounding area, the method comprising:
    recommending at least one locating method, which is to be carried out using at least one sensor of the multiple sensors in order to detect the surrounding area, for at least one position within the surrounding area according to the reference map;
    using the at least one locating method for a current position of the mobile device in order to locate the mobile device,
    wherein the at least one locating method is determined taking into consideration a perspective of the at least one sensor of the multiple sensors for the current position of the mobile device within the surrounding area; and
    determining the perspective of the at least one sensor of the multiple sensors as a function of a position of the at least one sensor of the multiple sensors and as a function of a detection direction of the at least one sensor of the multiple sensors starting from the position of the at least one sensor of the multiple sensors.

2. The method of claim 1, wherein the current position of the mobile device is a position along a planned path of movement of the mobile device.

3. The method of claim 1, wherein the surrounding area is subdivided into regions in the reference map, wherein, for positions within at least one of the regions, a same at least one locating method is recommended to be carried out using a same at least one sensor of the multiple sensors according to the reference map.

4. The method of claim 1, further comprising:
    determining the current position of the mobile device via a positioning system.

5. The method of claim 1, wherein recommending the at least one locating method further comprises:
recommending the at least one locating method for the at least one position based on a distribution of landmarks in the surrounding area.

6. The method of claim 5, wherein recommending the at least one locating method further comprises:
recommending the at least one locating method for the at least one position based on a density of the landmarks in the surrounding area.

7. The method of claim 5, wherein recommending the at least one locating method further comprises:
recommending the at least one locating method for the at least one position based on a distance of the at least one position from the landmarks in the surrounding area.

8. The method of claim 1, further comprising:
setting, via the at least one locating method, a range of the at least one sensor of the multiple sensors.

9. The method of claim 1, wherein the reference map is determined using reference measurements.

10. The method of claim 9, further comprising:
performing a plurality of the locating methods with a plurality of the sensors to determine the at least one locating method for the at least one position, which is to be carried out with the at least one sensor of the multiple sensors.

11. The method of claim 10, further comprising:
updating the reference map for the at least one position with the at least one locating method, which is to be carried out with the at least one sensor of the multiple sensors.

12. The method of claim 1, wherein the mobile device is a motor vehicle.

13. A system for locating a mobile device in a surrounding area, the system comprising:
multiple sensors for detecting the surrounding area using different locating methods; and
a reference map for the surrounding area, the reference map comprising multiple positions within the surrounding area,
wherein at least one of the different locating methods, which is to be carried out using at least one sensor of the multiple sensors in order to detect the surrounding area, is to be recommended for at least one position within the surrounding area according to the reference map,
wherein the at least one of the different locating methods, which is to be carried out using the at least one sensor of the multiple sensors, is to be used for a position of the mobile device in order to locate the mobile device,
wherein the at least one of the different locating methods is to be determined taking into consideration a perspective of the at least one sensor of the multiple sensors for the position of the mobile device within the surrounding area, and
wherein the perspective of the at least one sensor of the multiple sensors is determined as a function of a position of the at least one sensor of the multiple sensors and as a function of a detection direction of the at least one sensor of the multiple sensors starting from the position of the at least one sensor of the multiple sensors.

14. The system of claim 13, further comprising:
a control apparatus configured to determine the position of the mobile device by exchange of information with a positioning system, and to control the at least one sensor of the multiple sensors for carrying out the at least one of the different locating methods.

15. The system of claim 13, wherein the position of the mobile device is a position along a planned path of movement of the mobile device.

16. The system of claim 13, wherein the mobile device is a motor vehicle.

17. The system of claim 13, wherein a range of the at least one sensor of the multiple sensors is set via the at least one of the different locating methods.

18. The system of claim 13, wherein the at least one of the different locating methods is recommended according to the reference map for the at least one position in the surrounding area based on a distribution of landmarks in the surrounding area.

* * * * *